Figure 1:
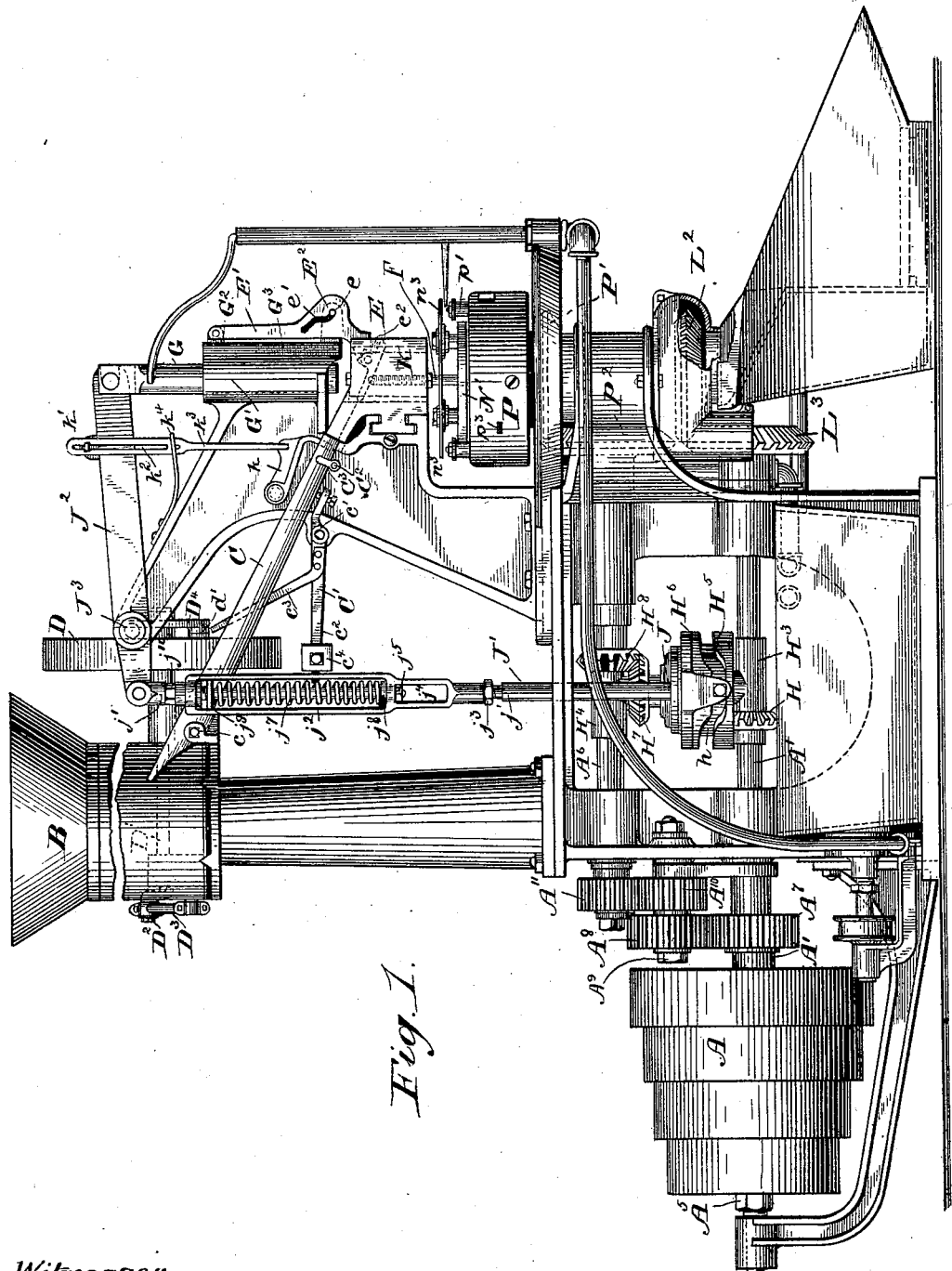

(No Model.)  8 Sheets—Sheet 1.

J. A. PLOPPER.
NUT TAPPING MACHINE.

No. 592,825.  Patented Nov. 2, 1897.

Witnesses.
Arthur Johnson
A. S. Wells

Inventor:
James A. Plopper
By his Attorney,
Walter H. Chamberlin (No Model.)
8 Sheets—Sheet 2.

J. A. PLOPPER.
NUT TAPPING MACHINE.

No. 592,825. Patented Nov. 2, 1897.

Witnesses.
Arthur Johnson
A. S. Wells

Inventor:
James A. Plopper
By Walter H. Chamberlin
Atty.

(No Model.) 8 Sheets—Sheet 3.
J. A. PLOPPER.
NUT TAPPING MACHINE.
No. 592,825. Patented Nov. 2, 1897.
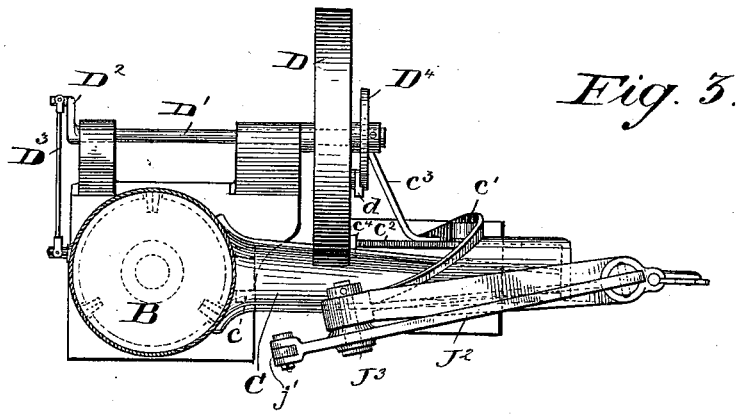
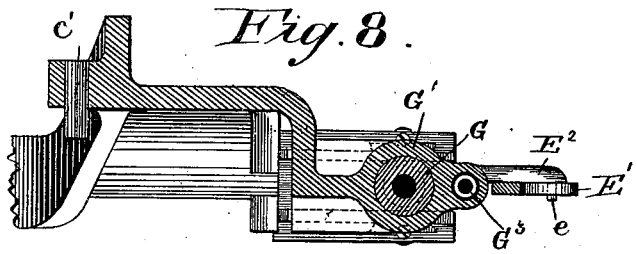
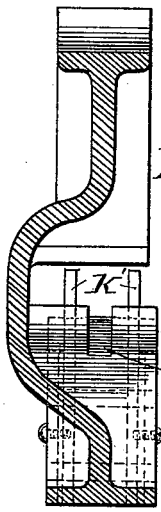
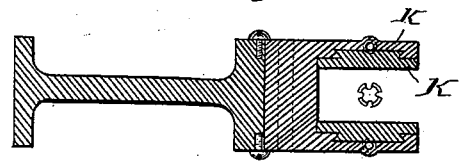
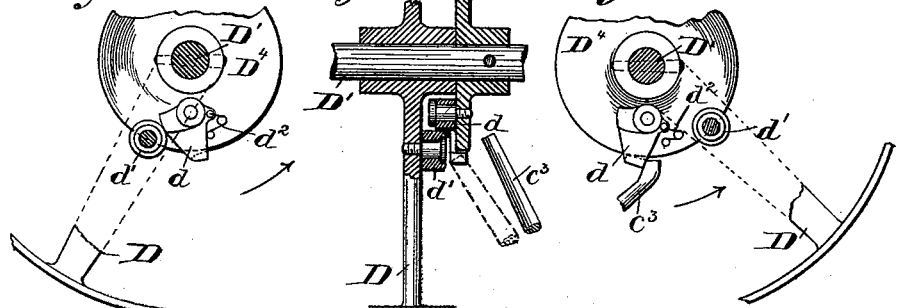
Witnesses
Arthur Johnson
A. S. Wells
Inventor
James A. Plopper
By His Attorney,
Walter H. Chamberlin (No Model.) 8 Sheets—Sheet 4.
J. A. PLOPPER.
NUT TAPPING MACHINE.
No. 592,825. Patented Nov. 2, 1897.
Fig. 10. Fig. 11. Fig. 12.
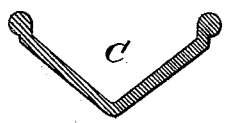
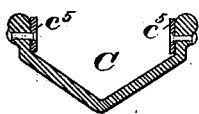
Fig. 13. Fig. 14. Fig. 15.
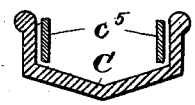
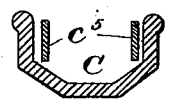
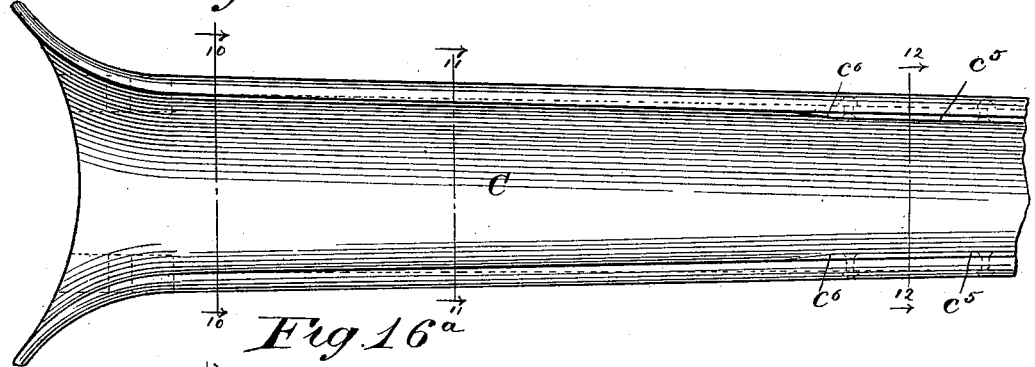
Fig. 16.
Fig. 16ª.
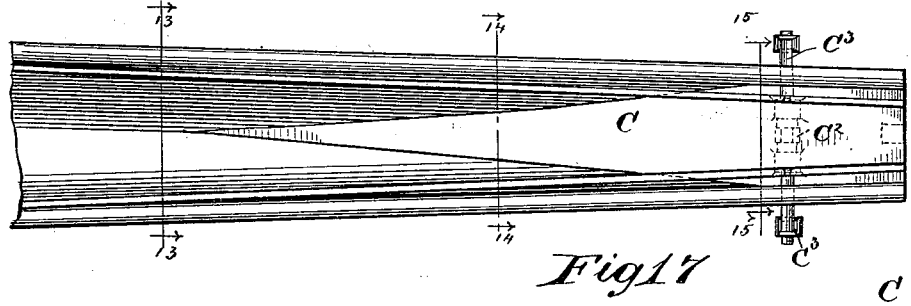
Fig. 17.
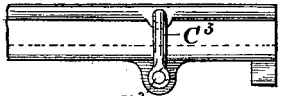
Witnesses.
Arthur Johnson
A. S. Wells
Inventor
James A. Plopper
By his Attorney,
Walter H. Chamberlin (No Model.) 8 Sheets—Sheet 5.
J. A. PLOPPER.
NUT TAPPING MACHINE.
No. 592,825. Patented Nov. 2, 1897.
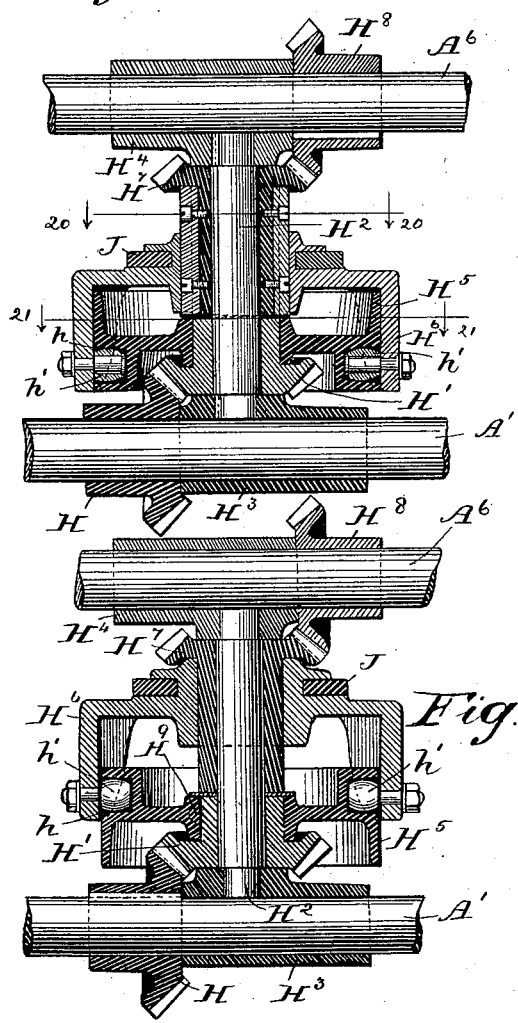
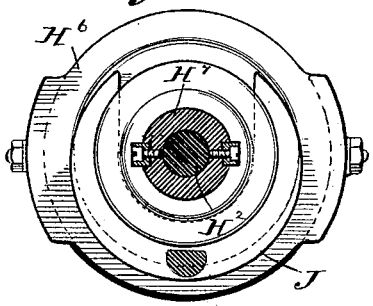
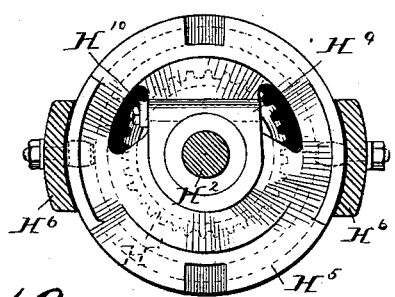
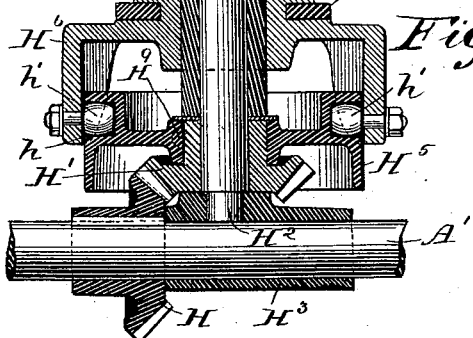
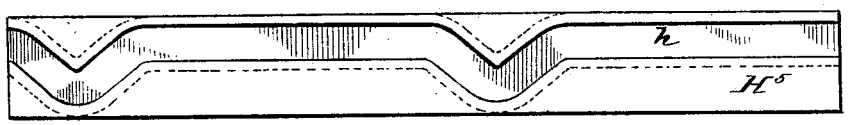
Witnesses
Arthur Johnson
A. S. Wells
Inventor
James A. Plopper
By his Attorney
Walter H. Chamberlin (No Model.) 8 Sheets—Sheet 6.

J. A. PLOPPER.
NUT TAPPING MACHINE.

No. 592,825. Patented Nov. 2, 1897.

Witnesses.
Arthur Johnson.
A. S. Wells

Inventor.
James A. Plopper
By his Attorney.
Walter H. Chamberlin

THE NORRIS PETERS CO., PHOTO-LITHO., WASHINGTON, D. C.

(No Model.) 8 Sheets—Sheet 7.
J. A. PLOPPER.
NUT TAPPING MACHINE.
No. 592,825. Patented Nov. 2, 1897.
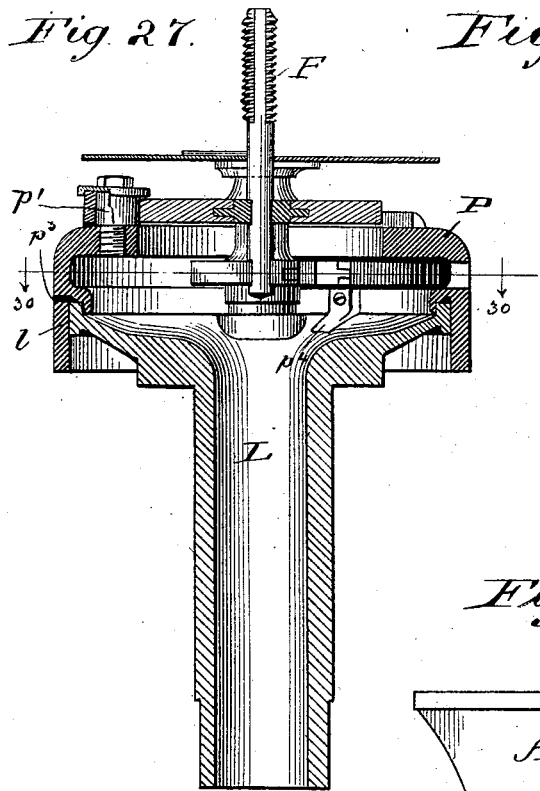
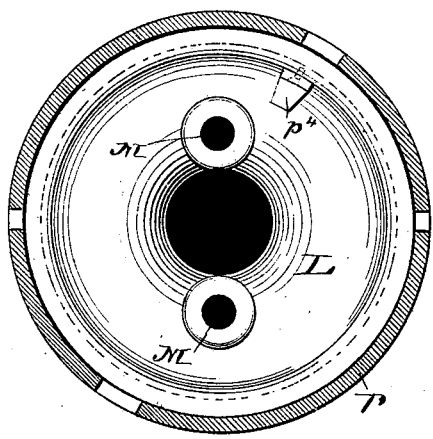
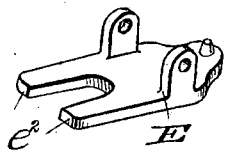
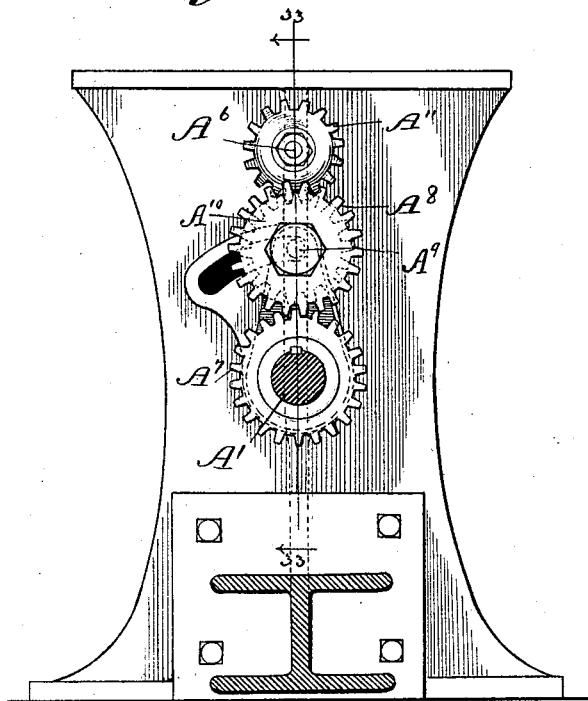
Witnesses
Arthur Johnson
A. S. Nellis
Inventor
James A. Plopper
By his Attorney,
Walter H. Chamberlin (No Model.)  8 Sheets—Sheet 8.

J. A. PLOPPER.
NUT TAPPING MACHINE.

No. 592,825.  Patented Nov. 2, 1897.

Witnesses.
Arthur Johnson.
A. S. Wills

Inventor.
James A. Plopper
By Walter H. Chamberlin
Atty.

UNITED STATES PATENT OFFICE.

JAMES A. PLOPPER, OF CHICAGO, ILLINOIS, ASSIGNOR, BY MESNE ASSIGNMENTS, TO ALBERT F. STERN, OF MILWAUKEE, WISCONSIN.

NUT-TAPPING MACHINE.

SPECIFICATION forming part of Letters Patent No. 592,825, dated November 2, 1897.

Application filed August 19, 1892. Serial No. 443,531. (No model.)

*To all whom it may concern:*

Be it known that I, JAMES A. PLOPPER, a citizen of the United States, residing at Chicago, county of Cook, State of Illinois, have invented a certain new and useful Improvement in Nut-Tapping Machines; and I declare the following to be a full, clear, and exact description of the invention, such as will enable others skilled in the art to which it pertains to make and use the same, reference being had to the accompanying drawings, which form a part of this specification.

My invention has for its object the production of a nut-tapping machine of that class wherein the tap is held in a vertical position and the nuts fed onto the upper end of the tap and off at the lower end without any cessation of the revolution thereof.

The invention relates particularly to certain improvements in the tap-holding chuck in the hopper and feeding mechanism, and also to making the machine adjustable to tap various-sized blanks.

Figure 2:
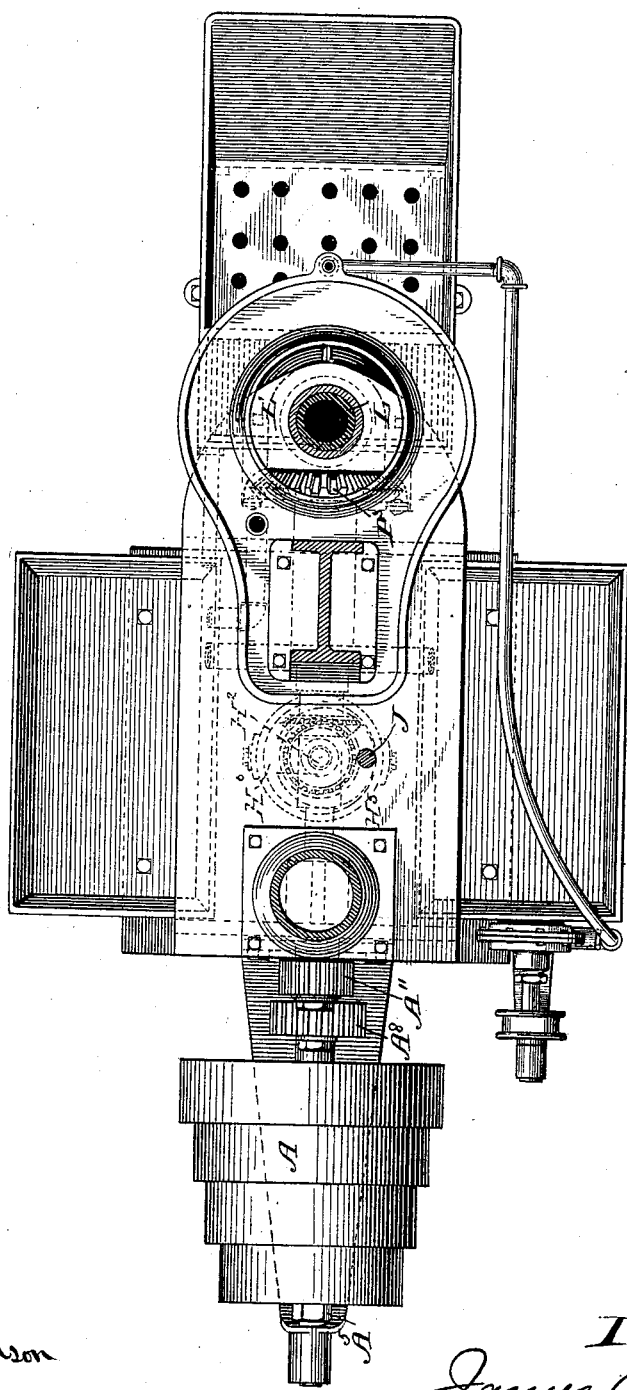
Figure 24:
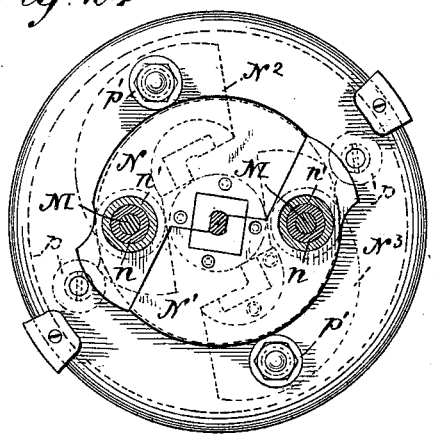
Figure 25:
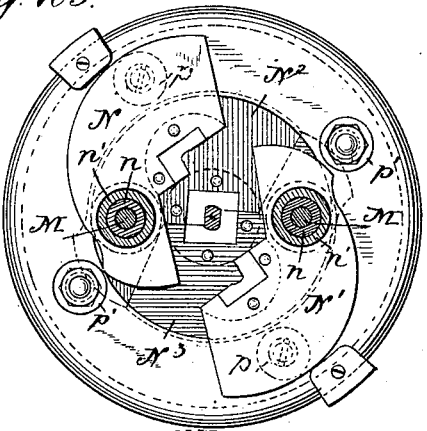
Figure 26:
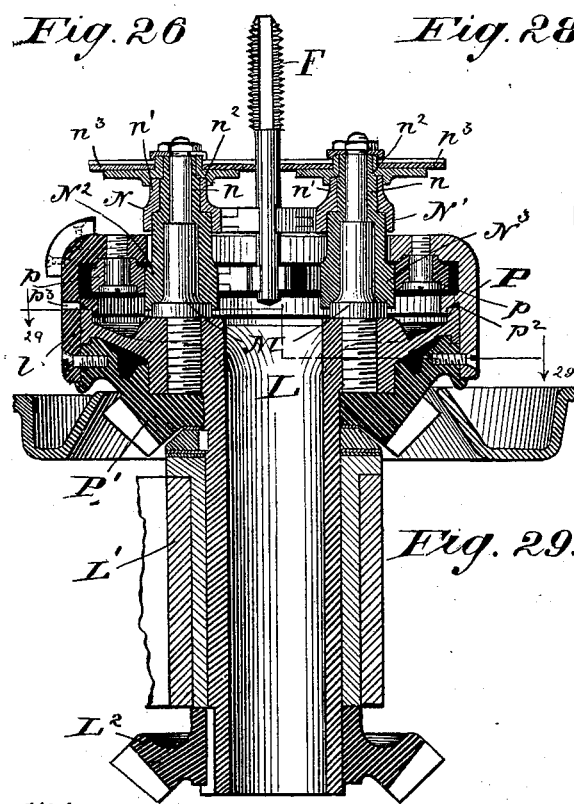
Figure 28:
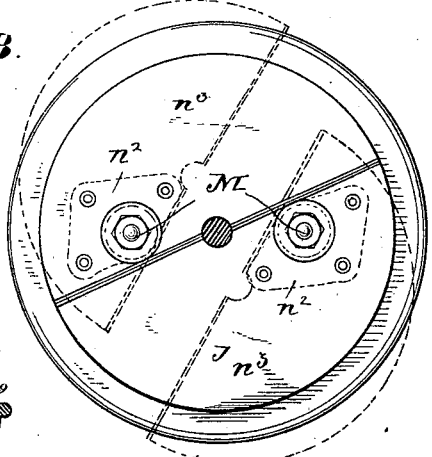
Figure 29:
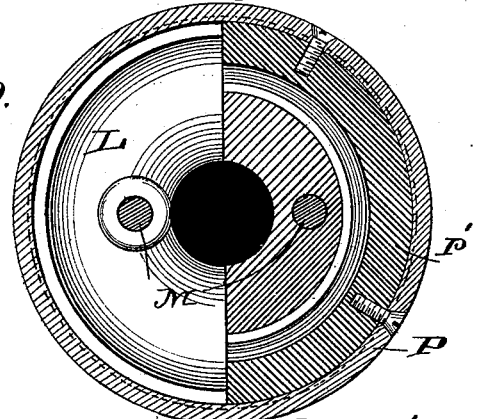
Figure 31:
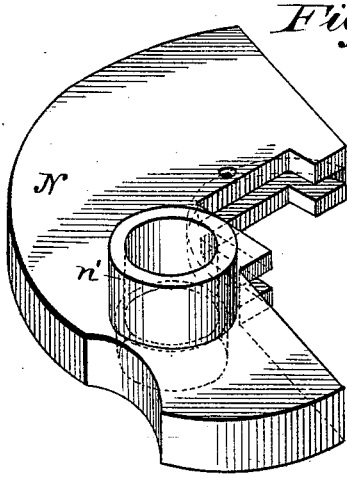
Figure 32:
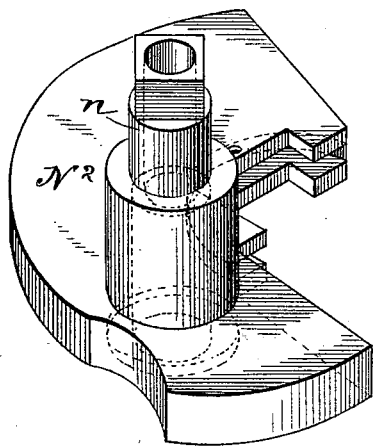
Figure 23:
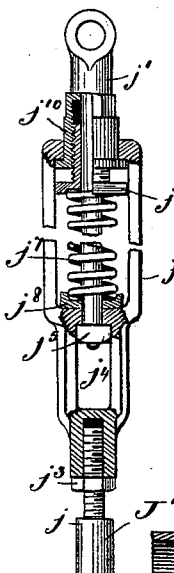
Figure 33:
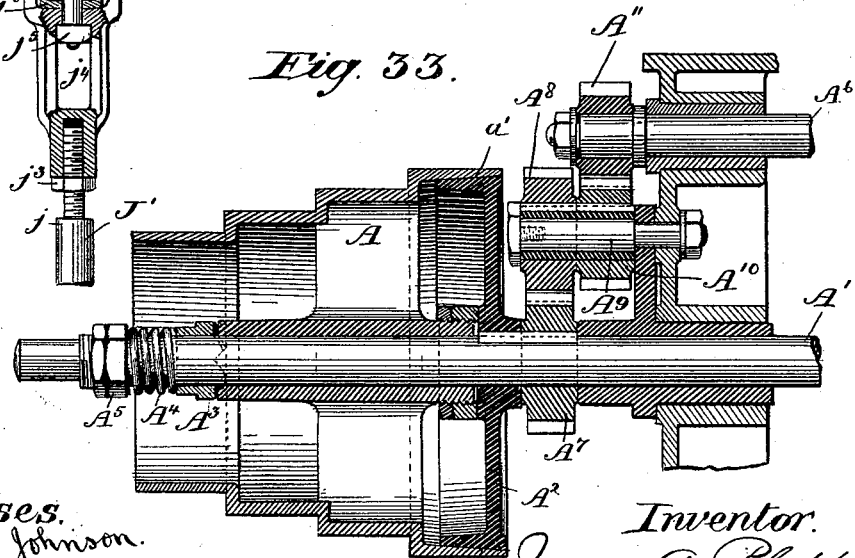

In the drawings, Figure 1 is a side elevation of my machine with some parts broken away. Fig. 2 is a plan view of the machine with parts in section. Figs. 3, 4, 5, and 6 are detail views illustrating the mechanism for imparting a motion to the hopper. Figs. 7, 8, and 9 are detail views of the plunger and surrounding parts. Figs. 10, 11, 12, 13, 14, 15, 16$^a$, and 17 are detail views of the feeding-trough. Figs. 18 and 19 are detail views with parts in section of the mechanism whereby motion is imparted to the plunger and feeding mechanism. Fig. 20 is a horizontal section on the line 20 20 of Fig. 18. Fig. 21 is also a horizontal section on the line 21 21 of Fig. 18. Fig. 22 is a detail view of the cam-groove. Fig. 23 is a detail view of the rod which connects the plunger with the driving mechanism. Fig. 24 is a plan view of the chuck with the upper jaws closed and the lower ones open. Fig. 25 illustrates the upper jaws open and the lower jaws closed. Fig. 26 is a vertical section of the chuck. Fig. 27 is also a vertical section on the line 27 27 of Fig. 24, parts being removed. Fig. 28 is a plan view of the same. Fig. 29 is a horizontal section on the line 29 29 of Fig. 26. Fig. 30 is a horizontal section on the line 30 30 of Fig. 27. Figs. 31 and 32 are perspective views of the chuck-jaws. Fig. 33 is a sectional view of the driving-pulleys and clutch mechanism. Fig. 34 is an elevation of the driving-gear. Fig. 35 is a perspective view of the shuttle.

In carrying out my invention, A represents the main driving-pulley, by means of which motion is imparted to the machine. This is located on the main shaft A'. (See Figs. 1 and 33.) To prevent the machine from being torn to pieces or strained should the operating mechanism become clogged in any way, I engage the pulley A to the shaft A' by a friction-clutch. The pulley is loosely sleeved onto the shaft and at $a$ is provided with a ground-surface which has a frictional contact with the periphery $a'$ of the pulley A$^2$, the latter being keyed to the shaft. To hold the pulley A in frictional contact with the pulley A$^2$, except when an unnecessary strain is thrown onto the shaft, I provide the sleeve A$^3$, having the toothed or serrated surface which engages the correspondingly serrated end of the hub of the pulley A. This sleeve is kept in contact with the hub by the spring A$^4$, and the latter held to the sleeve by the screw-nut A$^5$. It will thus be seen that by regulating the tension of the spring A$^4$ any desired strain on the shaft may be met.

B is the hopper into which the blanks are thrown. This hopper has an outer shell which has an oscillating motion around a stationary inclined false bottom.

C is the feeding-conduit, pivoted at $c$ to the frame of the machine. The lower end of the conduit has a slight play up and down and is supported by the end of the lever C', the latter being pivoted at $c'$ and provided with two arms $c^2$ $c^3$. On the arm $c^2$ is the adjustable weight $c^4$, while the arm $c^3$ is bent outwardly and upwardly and terminates adjacent to the pulley D. This pulley is loose on the shaft D', the end of the latter being provided with the crank D$^2$, and this crank connected with the hopper by the pitman D$^3$, so that a revolution of the shaft will agitate the hopper. Keyed to the shaft adjacent to the pulley is the collar D$^4$, and on this collar is pivoted the dog $d$, held normally in the position shown in Fig. 5 by the end of the arm $c^3$. Pivoted to the pulley D is the roller $d'$, and the respective positions of the dog and roller are so arranged that until the dog is thrown out of its normal position by the spring $d^2$ the roller as the pulley revolves will pass the dog without engaging it. Motion is imparted to the pulley from any suitable source. The nuts are fed from the conduit, as hereinafter explained, until the weight $c^4$ overcomes the weight of the conduit, when the weight $c^4$ raises the end of the conduit, and this movement of the lever C' throws the arm $c^3$ upward or to the position shown in Fig. 6. The spring $d^2$ then throws the dog to the position shown in Fig. 4, and at the next revolution of the pulley the roller engages the dog and forms a clutch, causing the collar $D^4$ and shaft D' to revolve with the pulley. When a sufficient number of blanks have entered the conduit, their weight overcomes the weight $c^4$ and the arm $c^3$ is thrown down and within the next revolution engages the dog and thus disengages the pulley. By adjusting the weight $c^4$ toward or from the pivotal point of the lever any desired quantity of blanks may be fed into the conduit. The conduit C is shaped in cross-section as shown in Figs. 10 to 15, so that the nuts will as they are fed assume a horizontal position.

In order that the machine may be adapted for different-sized nuts, I provide the adjustable side linings $c^5$, made of strips of flexible metal engaged at the upper ends $c^6$ to the sides of the conduit and having their lower ends made adjustable toward or from each other. The adjustment is obtained by the shaft $C^2$, provided with right and left hand screws on its ends, to which are engaged the crank-arms $C^3$, the ends of the latter passing through the sides of the conduit and being attached to the linings.

When a blank reaches the lower end of the conduit, it slides onto what may be termed the "shuttle" E. This shuttle is shaped, as shown in Fig. 35, with the two fingers $e^2$, which straddle the tap F, the latter being held in a vertical position by the chuck, as hereinafter explained. This brings the blank directly over the tap, and the plunger descending forces the blank onto the tap.

The mechanism for operating the plunger and shuttle I will now describe.

Keyed to the shaft A', Figs. 1 and 19, is the beveled gear H, and meshing therewith is the gear H', which is loose on the vertical shaft $H^2$. This latter is supported between the sleeves $H^3$ $H^4$, one on the shaft A' and the other on the upper shaft $A^6$. Engaged to the hub of the gear H' is the cam-wheel $H^5$, provided with the cam-groove $h$. Outside of and surrounding the cam-wheel is the shell $H^6$, provided on its interior with the rollers $h'$, which travel in the cam-groove. This shell is keyed to the gear $H^7$, but is free to move vertically thereon, and the said gear meshes with the gear $H^8$, which in turn is keyed to the shaft $A^6$. Located on the shaft A', adjacent to the pulley $A^2$, is the gear $A^7$, Figs. 33 and 34, which meshes with the gear $A^8$ on the auxiliary shaft $A^9$. Keyed to the latter is the gear $A^{10}$, which meshes with the gear $A^{11}$ on the shaft $A^6$. Motion is thus imparted to the shaft $A^6$, and by changing the size of the gears $A^{10}$ $A^{11}$ the difference in the speeds of the shafts A' $A^6$ may be altered at will. It will thus be seen that the motion of the shaft A' is imparted to the cam-wheel $H^5$, while the slower motion of the shaft $A^6$ is imparted to the shell $H^6$, thus causing the rollers $h'$ to at regular intervals ride over the cam-surfaces of the cam-groove. Engaged to the shell, so as to partake of its vertical motion, but not revolving therewith, is the collar J, Figs. 18, 19, and 20, and engaged to this collar is the rod J', Figs. 1 and 23. This rod extends up to the top of the machine and is pivoted to the lever $J^2$. The latter is pivoted to the frame at $J^3$ and the other end is pivoted to the plunger G. This plunger has a vertical motion in the socket G' on the frame, the lower end of the plunger being hollow and terminating above and adjacent to the end of the tap. The rod J' is composed of two sections $j\ j'$ with the intermediate yoke $j^2$. The upper end of the piece $j$ screws into the end of the yoke $j^2$ and is held in place by the jam-nut $j^3$. The lower end of the piece $j'$ passes loosely through the upper end of the yoke $j^2$ and terminates in the opening $j^4$, where there is a nut $j^5$. Surrounding the rod $j'$ is the spring $j^7$, the lower end bearing on the seat $j^8$, while the upper end bears on the adjustable seat $j^9$. The surface of the latter is screw-threaded to fit the screw-threaded interior of the nut $j^{10}$. The upper end of the yoke $j^2$ embraces but is movable on the exterior of the nut $j^{10}$. Now, as will be seen, the rollers $h'$, riding in the cam-groove, will force the rod J' upward. This will force the plunger down until it strikes the blank which has moved onto the shuttle E. The distance between the end of the plunger and the blank is not, however, as great as the upward movement of the rod J'. Consequently the upward movement of the rod compresses the spring $j^7$, and it is the pressure of the latter that forces the blank onto the tap.

In order that the cam-wheel $H^5$ may be so adjusted as to regulate the stroke of the plunger with the operation on the other parts, I engage the cam-wheel to the gear H' by the pin $H^9$, Figs. 19 and 21, the latter extending through the hub of the cam-wheel and provided with a circular notch or recess which fits the rounded face of the gear-hub. By tightening the nut $H^{10}$ the pin is bound tightly against the gear-hub, and this forms an adjustable fastening between the cam-wheel and gear. Working vertically in the socket G' is the head $G^2$, and beneath this head is the spring $G^3$, which normally holds the head in its upper position. Pivoted to the head is the plate E', and pivoted to the lower end of the latter is the shuttle E. Extending from the lower end of the socket is the rigid arm $E^2$, provided on its outer end with the pin $e$, which engages in the cam-slot $e'$ in the plate E'. A spring $e^2$ is provided to keep the shuttle E normally in position to receive the blank as it leaves the conduit and yet allow the shuttle to be depressed as the plunger forces down the blank. Thus as the plunger descends it will gradually force the shuttle E, plate E', and head $G^2$ downward, while the pin $e$, working in the cam-slot, will force the plate and shuttle outward until the shuttle clears the blank. As the plunger ascends the spring $G^3$ returns the parts to their normal positions with the shuttle ready to receive the next blank.

K is a block removably engaged to the frame of the machine by a dovetail engagement. The center of this block is channeled and shaped to receive and hold the blank as it is fed over the tap. The tap extends up into the block, as shown, Fig. 1. In order that the block may adjust itself to any irregularities in the size of the blank, I make the dovetail engagement rather loose, so that the block may have a slight play. In order that the same block may, if desired, be adapted for different-sized nuts, I line its interior with the metal plates or linings K', Fig. 9, which may be removed and replaced by thicker or thinner linings, as desired.

In order that the blanks may be held at the lower end of the conduit and fed therefrom one by one, I provide the cut-off which I will now explain. Pivoted to the frame of the machine, Fig. 1, is the lever $k$, the end of which is turned down so as to project into the path of the blanks in the conduit.

$k'$ is a projection on the lever $J^2$, working in the slot $k^2$ in the upper end of the rod $k^3$, the latter being pivoted at its lower end to the lever $k$. A spring $k^4$ keeps the rod $k^3$ and lever $k$ normally in the lower position, but the upward movement of the lever $J^2$ and plunger G raises the lever $k$ and allows a blank to slide down onto the shuttle.

I will now describe the construction of the tap-holding chuck.

L is the main stem or shaft of the chuck, to which the operative parts are engaged. It is hollow and is supported by the sleeve L', which is engaged to the frame. Keyed to the lower end of the shaft is the beveled gear $L^2$, which meshes with the beveled gear $L^3$ on the shaft A'. Projecting from the head of the shaft L are the pins M, to which the jaws which engage the tap are pivoted. There are two sets of these jaws, N N' and $N^2$ $N^3$. The two lower jaws are each provided with an upwardly-extending socket or sleeve $n$, which fits over the pin M, thus pivoting the jaws in place. The upper set of jaws is provided with a shorter socket or sleeve $n'$, which embraces the sleeve $n$ on the lower jaw. Thus both sets of jaws are pivoted on the stem of the chuck, but each set may oscillate independently. Surrounding the extending flange $l$ on the head of the stem L and supported by said flange is the shell P. Keyed to this shell and beneath the flange $l$ is the beveled gear P', which meshes with the beveled gear $P^2$ on the end of the shaft $A^6$. Thus, while the chuck, stem, and jaws partake of the speed of the shaft A', the shell P has the faster speed of the shaft $A^6$. On the interior of the shell and pivoted on vertical pins are the rollers $p$, Figs. 24 and 26, while on the exterior of the shell and on a line at right angles to the rollers $p$ are the rollers $p'$, Figs. 24 and 27. The inner edge of each jaw is so shaped, as shown, Figs. 24 and 25, that when the jaws are closed they embrace and hold a flattened portion of the tap shank, while the outer edge of each jaw has one portion that is concentric with the center of the shaft, while another portion is eccentric to the center of the shaft, so that as the rollers overtake and ride against the jaws they will be alternately opened and closed. Thus, the rollers for one set of jaws being at right angles to the line of the others, one set of jaws is open while the other is closed, and vice versa. Thus the tap is always grasped and the nut, after passing over the cutting portion of the tap, is dropped successively past the two sets of jaws and down to a suitable receptacle.

To prevent chips or shavings from getting down into the chuck, I extend the socket or sleeve $n$ up above the socket or sleeve $n'$ and provide it with a fitting $n^2$, which carries the plate $n^3$. Thus when the lower set of jaws is closed these plates are also closed around the tap and form a shield. In order that any small particles of chips or dust which may work into the bearing between the flange $l$ and the shell P may escape, I provide the adjacent surface of the shell with the groove $p^2$ and the orifice $p^3$, Fig. 26. The frictional contact between the two surfaces will cause any foreign particles to work out through the orifice. I also provide the clearing-knife $p^4$, Fig. 27, on the interior of the shell P to prevent, so far as possible, any chips from working up into the bearing between the shell and flange $l$.

The general operation of the machine is as follows: The blanks are deposited in the hopper and are fed singly through the conduit to the shuttle E, are carried by the latter to the tap, which is continuously revolving, as above described, are forced onto the tap by the plunger mechanism above described, are passed over the tap alternately past the holding-jaws, as above described, and are dropped into a suitable receptacle completely tapped.

It will be seen by the foregoing that I have produced a nut-tapping machine in which by the change of the gears $A^{10}$ $A^{11}$ and of the block K or its lining-plates, and by a corresponding change in the adjustment of such parts as the weight $c^4$ and conduit-linings $c^5$, the machine may be adapted for any diameter of tap within a prescribed range.

What I claim is—

1. The chuck herein described consisting of a horizontally-revolving main stem carrying two sets of horizontally-oscillating jaws the outer edges of said jaws having one portion concentric to the center of the shaft and another portion eccentric to the center of the shaft, and mechanism surrounding said stem adapted to bear on the outer edge of each jaw and thus act to alternately open and close each set substantially as described.

2. In a nut-tapping machine the tap-holding chuck consisting of a stem carrying two sets of horizontally-oscillating jaws, and an outer revolving shell having a different speed from that of the stem and adapted to alternately open and close the jaws, substantially as described.

3. In a nut-tapping machine the tap-holding chuck consisting of a main stem or shaft carrying two sets of horizontally-oscillating jaws, and an outer revolving shell having a different speed from that of the shaft or stem, said shell provided with pins which bear upon the edges of the jaws and act to alternately open and close them, substantially as described.

4. In a nut-tapping machine the tap-holding chuck consisting of a main shaft or stem carrying two sets of horizontally-oscillating jaws, a portion of the outer edge of each jaw being concentric to the center of the shaft while another portion is eccentric to the center of the shaft, and an outer revolving shell having a different speed from the stem and bearing upon the outer edges of the jaws, whereby said shell acts to alternately open and close the jaws, substantially as described.

5. In a nut-tapping machine the combination with two shafts having different speeds, of the tap-holding chuck consisting of a main shaft or stem engaged to the shaft having the faster speed, a shell surrounding the head of the chuck engaged to the shaft having the slower speed, and pivoted jaws on the stem adapted to be opened and closed by bearing on the shell as they pass the shell in their revolution, substantially as described.

6. In a nut-tapping machine the combination with two shafts having different speeds, of the tap-holding chuck consisting of a stem carrying two sets of horizontally-oscillating jaws, said stem engaged to the shaft having the faster speed, and an outer surrounding shell engaged to the shaft having the slower speed against which the outer edges of the jaws bear as they pass said shell in their revolution whereby the jaws are alternately opened and closed, substantially as described.

7. In a chuck for a nut-tapping machine the combination with the shaft or stem carrying two sets of horizontally-oscillating jaws, of a set of horizontally-oscillating guard-plates engaged to one set of jaws and moving therewith, said plates pivoted on vertical pivots, substantially as described.

8. In a chuck for a nut-tapping machine the combination with a shaft or stem carrying two sets of horizontally-oscillating jaws, one set located above the other, of a set of horizontally-oscillating guard-plates engaged to the same vertical pivots as the lower set of jaws and moving therewith, substantially as described.

9. In the herein-described chuck the combination with the shaft or stem and the outer surrounding shell revolving at a different speed from the shaft or stem, of a clearing-knife engaged to the shell and moving adjacent to the head of the stem and on the interior of the same, substantially as described.

10. In the herein-described chuck the combination with the shaft or stem and the outer surrounding shell supported thereby, of the flange on the shell which bears on the flange on the stem, one of said flanges provided with a groove and an opening leading therefrom whereby foreign particles may work out from the bearing between the shell and stem, substantially as described.

11. In a nut-tapping machine the combination with the hopper and the tap, of a trough or conduit leading from the hopper to the tap, said conduit being a V shape in cross-section at its upper end and gradually changing its shape in cross-section from a V shape, first to a cross-section with upright sides where the sides and bottom form three angles, then to a substantially V shape with the sides and bottom forming four angles, and lastly to a U shape with the sides and bottom forming two angles, substantially as described.

12. In a nut-tapping machine the combination with the hopper and the tap, of a conduit leading from the hopper to the tap, said conduit provided with side linings adjustable at the lower end whereby the diameter of the lower end of the conduit may be varied, substantially as described.

13. The combination with the conduit of side linings for varying the diameter of the lower end, consisting of strips of metal engaged at one end to the sides of the conduit the opposite ends being engaged by adjusting mechanism whereby they may be moved toward or from each other, substantially as described.

14. The combination with the trough or conduit, of adjustable linings therefor, said linings pivoted at their upper ends to the sides of the conduit, the lower ends of the linings being engaged by angular arms, and the latter being engaged to a right and left hand screw, whereby the ends of the linings may be adjusted toward or from each other, substantially as described.

15. In a nut-tapping machine the combination with the tap and the plunger for forcing the blanks thereon, of means for giving said plunger a reciprocating motion, consisting of a lever pivoted to the plunger and fulcrumed on the frame of the machine, the opposite end of said lever connected with a vertically-reciprocating shell engaged in a cam-groove of a horizontally-revolving pulley, substantially as described.

16. In a nut-tapping machine the combination with the tap and the plunger for forcing the nuts thereon, of means for giving said plunger reciprocating motion, consisting of two horizontal shafts revolving at different speeds, a horizontal pulley connected by gears to one shaft and a vertical reciprocating shell connected by gears to the other shaft, said shell shaped to engage in a cam-groove in the horizontally-revolving pulley, substantially as described.

17. In a nut-tapping machine the combination with the shafts A A$^6$ of the pulley H$^5$ provided with a cam-groove $h$ and connected by beveled gears with the shaft A' and the shell H$^6$ provided with rollers $h'$ which engage the cam-groove $h$ said shell engaged by beveled gears with the shaft A$^6$, substantially as described.

18. In a nut-tapping machine the combination with the tap, and the plunger for forcing the blanks thereon, of a hollow block in the center within which the tap revolves, said block having loose or yielding connection with the frame of the machine, substantially as described.

19. In a nut-tapping machine the combination with the tap, of a hollow block within which it revolves, said block engaged to the frame of the machine by a loose dovetail engagement, substantially as described.

20. In a nut-tapping machine the combination with the conduit and the reciprocating-plunger mechanism, of a lever $k$ pivoted adjacent to the conduit, one end provided with a pin adapted to engage the foremost blank in the conduit and hold it against further movement, said lever connected with the reciprocating-plunger mechanism, substantially as described.

21. In a nut-tapping machine the combination with the conduit and the lever J$^2$, of a lever $k$ pivoted adjacent to the conduit, one end provided with a pin adapted to engage the blanks in the conduit, said lever connected by the rod $k^3$ with the lever J$^2$, substantially as described.

In testimony whereof I sign this specification, in the presence of two witnesses, this 29th day of December, 1891.

JAMES A. PLOPPER.

Witnesses:
C. H. GURNEY,
W. H. CHAMBERLIN.